United States Patent
Redmond et al.

(10) Patent No.: US 12,235,143 B2
(45) Date of Patent: Feb. 25, 2025

(54) ENERGY AUTONOMOUS GAS FLOW METER

(71) Applicant: SCHNEIDER ELECTRIC SYSTEMS USA, INC., Foxboro, MA (US)

(72) Inventors: James Redmond, Richmond (CA); Zackery Sobin, Raleigh, NC (US)

(73) Assignee: Schneider Electric Systems USA, Inc., Foxboro (MA)

( * ) Notice: Subject to any disclaimer, the term of this patent is extended or adjusted under 35 U.S.C. 154(b) by 190 days.

(21) Appl. No.: 17/097,440

(22) Filed: Nov. 13, 2020

(65) Prior Publication Data

US 2022/0155111 A1    May 19, 2022

(51) Int. Cl.
| | |
|---|---|
| *G01F 1/115* | (2006.01) |
| *G01F 1/075* | (2006.01) |
| *G01F 1/36* | (2006.01) |
| *G01F 1/42* | (2006.01) |

(52) U.S. Cl.
CPC .............. *G01F 1/115* (2013.01); *G01F 1/075* (2013.01); *G01F 1/36* (2013.01); *G01F 1/42* (2013.01)

(58) Field of Classification Search
CPC ............ G01F 1/053; G01F 1/06; G01F 1/075; G01F 1/0755; G01F 1/10; G01F 1/115; G01F 1/1155; G01F 1/36
See application file for complete search history.

(56) References Cited

U.S. PATENT DOCUMENTS

| | | | | |
|---|---|---|---|---|
| 4,216,673 | A * | 8/1980 | November | G01F 1/90 73/861.03 |
| 4,940,976 | A * | 7/1990 | Gastouniotis | G01F 15/066 340/870.31 |
| 6,886,414 | B2 * | 5/2005 | Gutierrez | G01F 15/066 73/861.78 |
| 8,746,032 | B1 * | 6/2014 | Feller | G01F 5/00 73/1.35 |
| 2013/0178750 | A1 | 7/2013 | Sheehan et al. | |
| 2016/0041019 | A1 | 2/2016 | Hannon | |

(Continued)

FOREIGN PATENT DOCUMENTS

| | | | |
|---|---|---|---|
| EP | 3023632 | A1 | 5/2016 |
| EP | 3348972 | A1 | 7/2018 |
| FR | 2847339 | A1 | 5/2004 |

(Continued)

OTHER PUBLICATIONS

Extended European Search Report and European Seach Opinion dated Mar. 30, 2022 for EP Application No. 21204411.9-1001, 11 pages.
European Examination Report dated Sep. 26, 2024 for corresponding European Patent Application No. 21204411.9, 9 pages.

*Primary Examiner* — Erika J. Villaluna (74) *Attorney, Agent, or Firm* — Troutman Pepper Locke LLP (57) ABSTRACT

A flow meter system and method are provided for monitoring gas flow in a conduit. The flow meter system includes a plurality of components including: a sensor for sensing a flow rate of the gas flow; a communication device for transmitting information corresponding to the sensed flow rate to a remote device; an energy harvesting device for producing electrical energy from the gas flow to power operation of the communication device or other component of the flow meter system; and an energy storage device for storing electrical energy generated by the energy harvesting device.

20 Claims, 6 Drawing Sheets

(56) References Cited

U.S. PATENT DOCUMENTS

2017/0085966 A1 3/2017 Berkcan et al.
2019/0175065 A1 6/2019 Knestel

FOREIGN PATENT DOCUMENTS

WO 2009130030 A1 10/2009
WO 2011014187 A1 2/2011

* cited by examiner

ENERGY AUTONOMOUS GAS FLOW METER

FIELD

The present disclosure is generally directed to a gas flow meter, and more particularly, to harvesting energy from gas flow to power a gas flow meter.

BACKGROUND

An industrial process or facility may employ conduits, such as pipes (also referred to as piping) or other fluid carrying structures, to convey fluids for processing. The fluids may, for example, be a gas and/or a liquid, and may be compressible or incompressible. The industrial processing system can employ monitoring devices, such as flow meters, to monitor characteristics of the fluids throughout the industrial process. Flow meters may be powered using powerlines; however, the amount of power through such powerlines may be limited such as in hazardous processing environments for safety purposes. Flow meters may also be powered using a battery, which would need to be checked periodically and replaced when exhausted or depleted.

SUMMARY

In accordance with an embodiment, a flow meter system and method are provided for monitoring gas flow in a conduit. The flow meter system comprises a plurality of components including: a sensor for sensing a flow rate of the gas flow; a communication device for transmitting information corresponding to the sensed flow rate to a remote device; an energy harvesting device for producing electrical energy from the gas flow to power operation of the communication device or other component of the flow meter system; and an energy storage device for storing electrical energy generated by the energy harvesting device.

In accordance with an embodiment, the sensor can be configured to sense the flow rate using the energy harvesting device or a component thereof. The energy harvesting device can comprise a turbine through which the gas flow passes. The turbine can include a rotor with a magnet, and a stator with an electrical (or conductive) coil. The rotor is configured to rotate due to gas flow thereby generating current, on the electrical coil, for charging an energy storage device or powering one or more components of the flow meter. The sensor is configured to sense the current on the electrical coil which has a frequency corresponding to the flow rate of the gas flow. The flow meter system can further comprise an AC-to-DC converter for converting alternating current (AC) on the electrical coil to direct current (DC) for charging the energy storage device or powering one or more components of the flow meter system.

In accordance with an embodiment, the energy harvesting device can comprise a differential pressure conduit having an orifice plate through which the gas flow passes, and a thermoelectric generator to convert heat generated from the gas flow passing through the differential pressure conduit to electrical energy for charging the energy storage device or powering one or more components of the flow meter system. The sensor can comprise a pressure differential sensor for sensing a pressure differential of the gas flow upstream and downstream of the orifice plate using pressure taps.

In accordance with a further embodiment, the energy harvesting device can comprise a turbine for generating electrical energy from the gas flow. The conduit includes an orifice plate. The sensor comprises a pressure differential sensor for sensing a pressure differential of the gas flow upstream and downstream of the orifice plate using pressure taps. The turbine is configured to receive a portion of the gas flow from the conduit through at least one of the pressure taps. The flow meter can further comprise a valve switch for selectively directing the portion of the gas flow to the pressure differential sensor or the turbine.

In accordance with another embodiment, the information, which corresponds to the flow rate, can be transmitted in real time as a pulse signal via the communication device. Furthermore, in response to the flow rate of the fluid falling below a level at which the electrical energy generated by the energy harvesting device is sufficient to power one or more components of the flow meter, the one or more components of the flow meter can be powered using the stored electrical energy of the energy storage device.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

A monitoring system and method are provided to monitor fluid, such as gas, flowing through a conduit in a process, such as an industrial or automated process, using a gas flow meter or other flow sensor. The system and method can employ energy harvesting techniques to harvest energy, which is produced directly or indirectly from the gas flow to be monitored. The harvested energy can be used to power component(s) of the monitoring system, or stored in an energy storage device for future use to power component(s)

of the monitoring system under certain conditions. For example, the harvested energy can be used to charge an energy storage device, such as a battery or capacitor, for powering the meter during times of no or reduced flow. The incorporation of an energy harvesting device in the meter can allow for increased transmission rate by increasing the potential available power to the communication device and prevent or reduce the need for battery replacement, thereby reducing labor and improving functionality of flow meters.

In various embodiments, the energy harvesting techniques can include the use of a turbine, thermoelectric generator or other device capable of converting energy from the flow of the monitored gas to electrical or other energy form, which can be used to power component(s) of the monitoring system. The information, which corresponds to the flow rate, can also be transmitted in real time as a pulse signal via a communication device. Furthermore, in response to the flow rate of the fluid falling below a level at which the electrical energy generated by the energy harvesting device is sufficient to power one or more components of the flow meter, the one or more components of the flow meter can be powered using the stored electrical energy from the energy storage device.

These and other example features of the present disclosure will be described below in further detail with reference to the figures.

Figure 1:
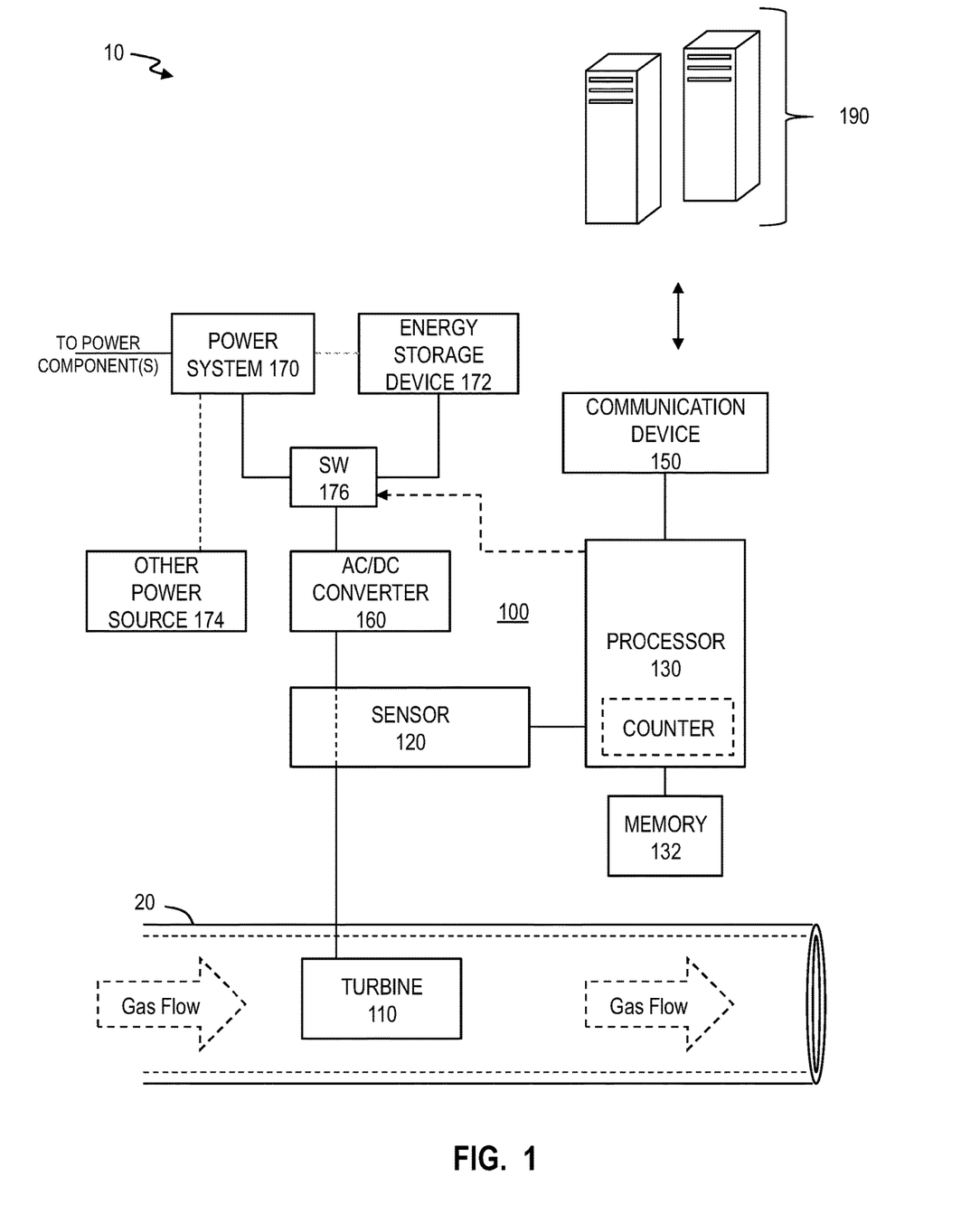
FIG. 1 illustrates an example of a monitoring system, which includes a gas flow meter having an energy harvesting device to generate energy from gas flow to be monitored in accordance with a first embodiment.

FIG. 1 is an overview of example of a monitoring system 10, which can include a computer system 190 for monitoring and/or controlling a process, such as an industrial process and its equipment, and one more sensors for sensing environmental and operational characteristics of the process. The computer system 190 can be a PLC controller or other computer system, which is configured to communicate with the one or more sensors. The computer system 190 can control operations of the industrial process and its equipment according to the information received from the one or more sensors. The computer system 190 can be situated in a control room or other control facility in an industrial facility.

The one or more sensors can include a flow meter such as a gas flow meter 100, in accordance with a first embodiment of the present disclosure. In this example, the gas flow meter 100 is a turbine flow meter for monitoring flow characteristics of gas flow through a conduit 20, such as for example a pipe or other fluid carrying channel. The flow meter 100 can include a turbine 110, a sensor 120, a processor(s) 130, memory 132 and a communication device 150.

The turbine 110 can include a rotor with magnets, and a stator with electrical (or conductive) coils. In operation, the rotor is configured to rotate as a result of the flow of gas (or gas flow) through the conduit 20 and across the rotor. The rotation of the rotor (with the permanent magnets) generates a magnetic flux, which in turn generates electrical energy/signals, such as current in the form of electrical pulses, on the coils of the stator. The rate of the electrical pulses corresponds or is proportional to the rotational frequency of the rotor, which in turn corresponds or is proportional to characteristics of the gas flow, such as the flow rate of the gas. The sensor 120, such as a current sensor, senses the current on the electrical coils, and may perform some signal conditioning. The sensed current is provided to the processor 130, which can maintain a count of the number of rotation according to the electrical pulses of the sensed current, and determine a flow rate (or fluid velocity) by dividing the count over the duration (e.g., time period). The processor 130 can output a pulse signal or data corresponding to the flow rate or other flow characteristics of the gas flowing through the conduit 20. The other flow characteristics can be derived from the monitored flow rate.

The memory 132 can store data, which can include computer program(s) or executable code, sensor operational parameters, or other data used by the processor 130. The processor 130, which is coupled to the memory 132, can control components and functions of the flow meter 100, such as described herein. The communication device 150 can perform wireline or wireless communication (e.g., radio) with other remote devices, such as the computer 190, to transmit and/or receive data, via transmitting medium or network. The transmitted data can include the monitored flow characteristics, such as flow rate of the gas.

The flow meter 100 also includes a power system 170 for supplying power to the components of the flow meter 100. The power system 170 can receive and distribute power from an energy stored device 172 such as a battery or capacitor, from other power source(s) 174 (e.g., a power line from a control center or external source), and/or from the turbine 110. In this example, the turbine 110 can also be used as an energy harvesting device. As described above, the turbine 110 can include a rotor with permanent magnets and a stator with electrical coils, and can generate electrical energy/signals, e.g., current, through the coils as a result of the magnetic flux generated by rotation of the rotor due to gas flow. The electrical energy generated from the turbine 110 can be converted from alternating current (AC) to direct current (DC) using an AC/DC converter 160, and can be used to power one or more components of the flow meter 100, such as the communication device 150, or charge the energy storage device 172.

In various embodiments, the processor 130 can selectively control the supply of power from any one or combination of the different sources to the components of the flow meter 100, via a switch(es) 176. The processor can also be configured to control the storage of electrical energy generated by the turbine 110 in the energy storage device 172, and to supplement supply of power from other power source 174 to the power system 170 using the energy from the turbine 100 or the energy storage device 172.

Figure 2:
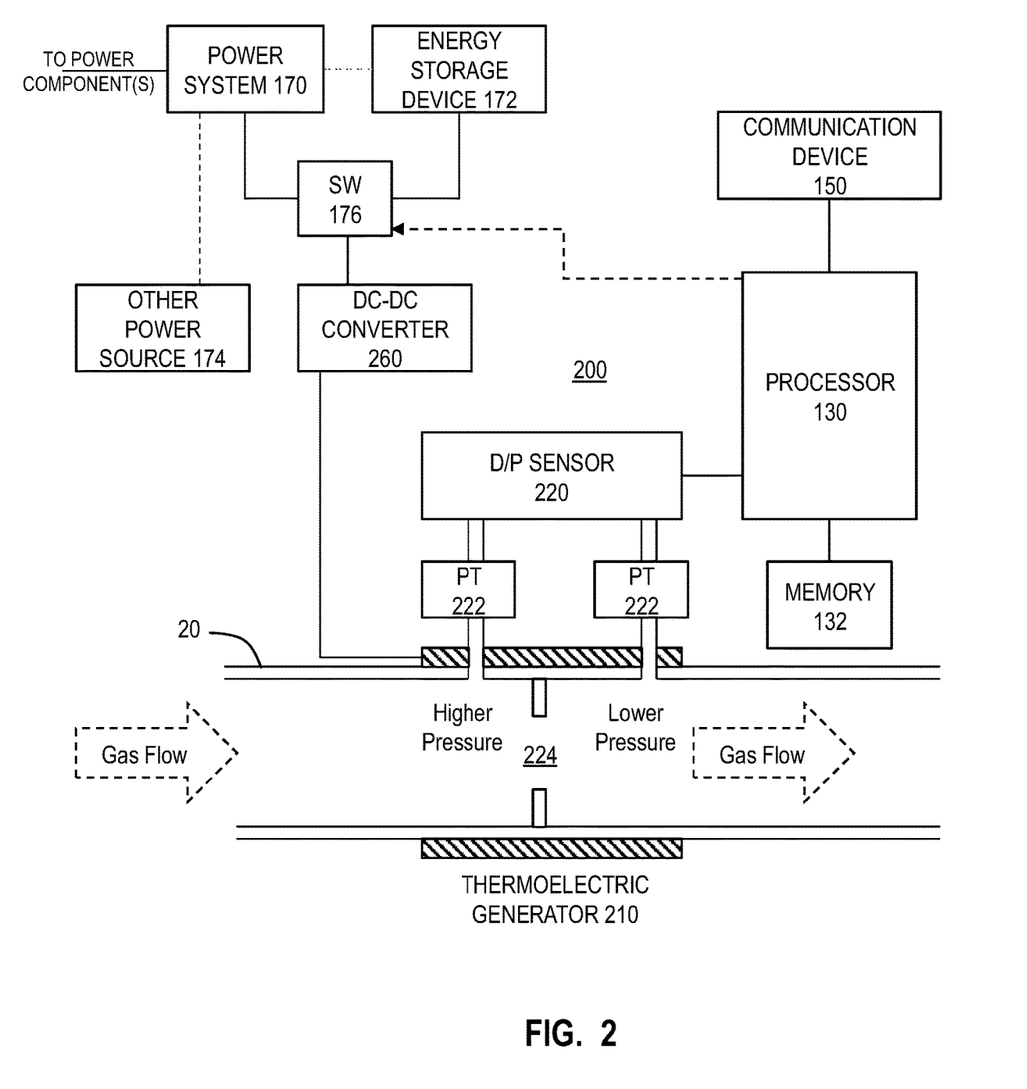
FIG. 2 is an overview of an example gas flow meter including an energy harvesting device to generate energy from gas flow to be monitored in accordance with a second embodiment.

FIG. 2 is an overview of an example gas flow meter 200 including an energy harvesting device to generate energy from gas flow to be monitored in accordance with a second embodiment. In this example, the flow meter is a differential pressure (DP or D/P) flow meter.

As shown in FIG. 2, the flow meter 200 includes an orifice plate 224 (e.g., a plate with central hole or opening) in the conduit 20. The orifice plate 224 defines a higher (or high) pressure region downstream of the orifice plate 224 and a lower (or low) pressure region upstream of the orifice plate. A holding system may also be provided to retain the orifice plate 224 in the conduit at a desired position. The flow meter 200 also includes inlet and outlet pressure taps (PT) 222, which allow a diversion of a portion of the gas flow from the higher pressure region to a differential pressure (D/P) sensor 220 (also referred to as a D/P cell) and a return of the diverted gas flow to the lower pressure region in the conduit 20.

The differential pressure sensor 120 can measure a differential pressure across the restriction of the orifice plate 224. For example, the relationship between a velocity of fluid passing through the orifice of the orifice plate 224 is proportional to the square root of the pressure loss across it. The processor 130 can receive the differential pressure measurement to determine the flow characteristics, such as the flow rate, of the gas. In various embodiments, the processor 130 can receive the pressure differential measurement along with temperature and/or pressure data, which can enable the processor 130 to compensate for changes in fluid density and provide a more accurate measure of the flow characteristic of the gas.

The flow meter 200 also includes a power system 170 for supplying power to the components of the flow meter 200. The power system 170 can receive power from an energy stored device 172 such as a battery or capacitor, from other power source 174 (e.g., a power line from a control center), and/or from a thermoelectric generator 210. In this example, the thermoelectric generator (TEG) 210 is used as an energy harvesting device to convert heat generated from the conduit (e.g., piping or portion thereof made of a thermo-conductive material), due to the gas flow around and through the orifice plate 224. The thermoelectric generator (e.g., a Seebeck generator) can be a solid state device that can convert heat flux (e.g., temperature differences) directly into electrical energy. The electrical energy generated from the thermoelectric generator can be stabilized using an DC/DC converter 260, and can be used to power one or more components of the flow meter 200, such as the communication device 150, or charge the energy storage device 172.

As with the embodiment of FIG. 2, in various embodiments, the processor 130 can selectively control the supply of power from any one or combination of the different sources to the components of the flow meter 100, via a switch(es) 176. The processor can also be configured to control the storage of electrical energy generated by the thermoelectric generator 210 in the energy storage device 172, and to supplement supply of power from other power source 174 to the power system 170 using the energy from the thermoelectric generator 210 or the energy storage device 172.

Figure 3:
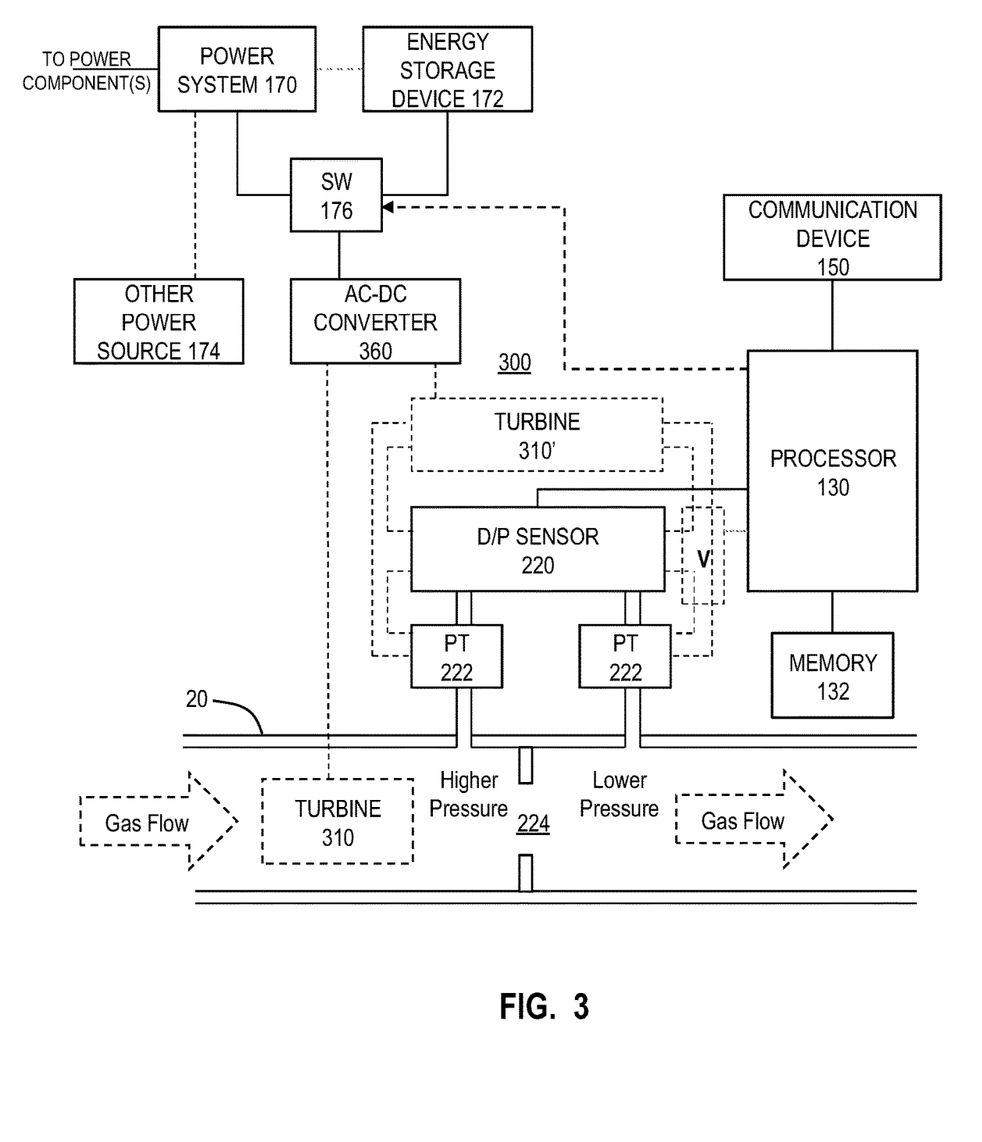
FIG. 3 is an overview of an example gas flow meter including an energy harvesting device to generate energy from gas flow to be monitored in accordance with a third embodiment.

FIG. 3 is an overview of an example gas flow meter 300 including an energy harvesting device to generate energy from gas flow to be monitored in accordance with a third embodiment. In this example, the gas flow meter 300 can include the same or similar components as the flow meter 200 of FIG. 2 (e.g., D/P sensor 220, PTs 222 and orifice plate 224), except that the gas flow meter 300 uses a turbine to harvest energy from the gas flow.

In one example, the energy harvesting device can be a turbine 310 which is placed in the conduit 20. The turbine 310 can include a rotor with magnets and a stator with electrical coils, and can generate electrical energy (e.g., current) through the coils as a result of the magnetic flux generated by rotation of the rotor due to gas flow. The electrical energy generated by the turbine 310 can be converted from AC to DC using an AC-DC converter 360. In various embodiments, the turbine 310 may impact the pressure differential used to determine the flow characteristic of the gas flow, such as the flow rate, through the conduit 20. As such, the processor 130 may calibrate the flow characteristic measurement/determination of the gas flow according to the impact of the turbine 310 on the pressure differential downstream/upstream of the orifice 224.

In a second alternative example, the energy harvesting device can be a turbine 310', which is arranged outside of the conduit 20. The flow meter 300 can divert or bypass a portion of the gas flow from the conduit 20, using the pressure tap 222, to the turbine 310' so that the turbine 310' can generate electrical energy from the diverted gas flow. A valve switch v can be used to control the gas flow from the pressure taps 222 to either the D/P sensor 220 or the turbine 310'. For example, the processor 130 can use the turbine 310' to generate electrical energy, when monitoring is not being performed using the D/P sensor 220. In various embodiments, the processor 130 can for example control the gas flow, via the valve switch v, to alternate between sensing the flow characteristic using the D/P sensor and generating electrical energy using the turbine 310' (e.g., monitoring duration $T_M$ followed by an energy generating duration TE, some other time pattern between monitoring duration and energy generating duration, and so forth). The electrical energy generated by the turbine 310' can be converted from AC to DC using an AC-DC converter 360.

Figure 4:
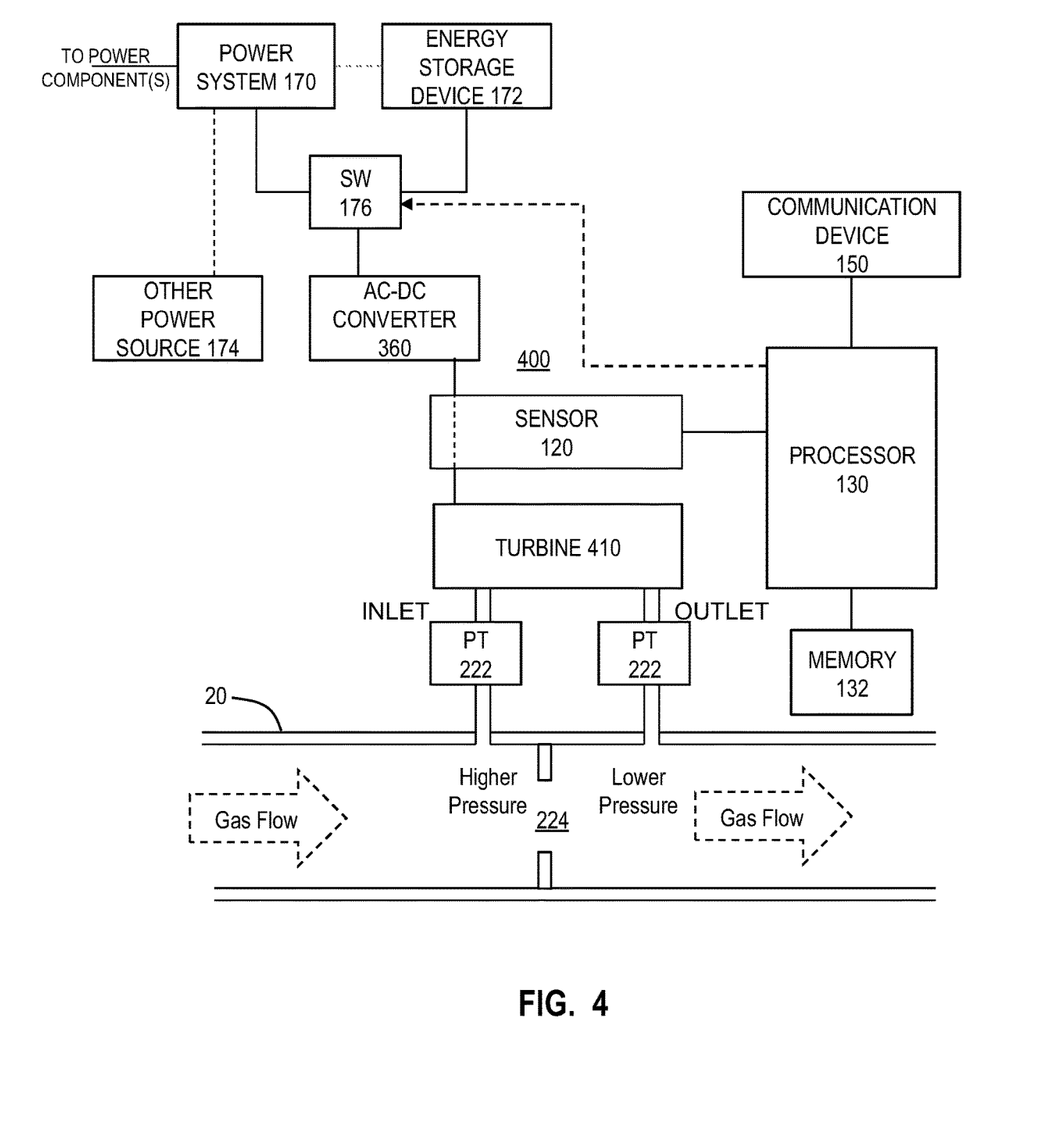
FIG. 4 is an overview of an example gas flow meter including an energy harvesting device to generate energy from gas flow to be monitored in accordance with a fourth embodiment.

As to the second alternative example, if a small turbine meter is used to bypass flow around the orifice plate 24, power can be generated without excessively disturbing the D/P measurement by the D/P sensor 220. The bypassed flow can also be accounted for since it is measured by the turbine 310'. Alternatively, the D/P sensor 220 can be omitted and the differential pressure (D/P) can be inferred by examining the flow rate through the turbine and considering the characteristics of the fluid, such as shown by a fourth embodiment in FIG. 4. As shown in FIG. 4, gas flow can be diverted to a turbine 410, using the pressure taps (PT) 222. The turbine 410 is arranged outside of the conduit 20, in contrast to the turbine of the first embodiment in FIG. 1 which has component(s) arranged inside of the conduit 20. However, similar to the example in the first embodiment, a turbine, in this case turbine 410 of FIG. 4, can be used to monitor the flow characteristics of the gas flow, and to generate electrical energy for use by the flow meter 400. The monitored flow characteristic can be further adjusted in light of the characteristics of the fluid (e.g., temperature, density, etc.), which may be monitored or derived using information gathered from additional sensor(s).

Figure 5:
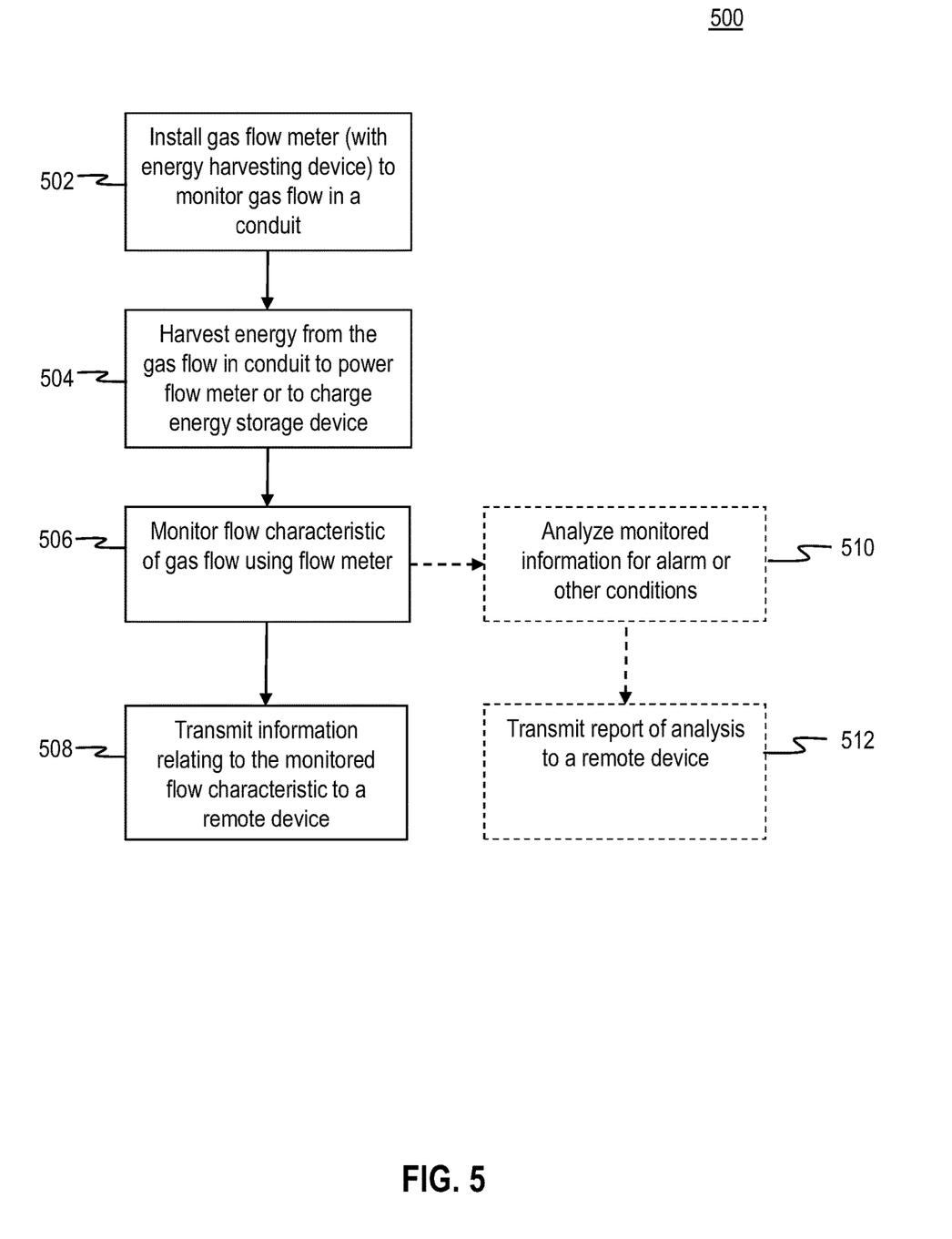
FIG. 5 illustrates an example method of operation of a flow meter and its components in accordance with an embodiment.

FIG. 5 illustrates an example method of operation of a flow meter (e.g., in FIG. 1, 2, 3 or 4) and its components in accordance with an embodiment. The flow meter can include a processor(s), sensor(s), communication device and energy harvesting device. Some of the operations of the method 500 may be performed by or under control of one or more processors of the monitoring system.

At block 502, a gas flow meter with energy harvesting device is installed to monitor gas flow in a conduit.

At block 504, energy is harvested from the gas flow in the conduit by the energy harvesting device to power one or more components of the flow meter or to charge an energy storage device (e.g., rechargeable battery or capacitor) which can be used later to power or supplement power to one or more components of the flow meter.

At block 506, the flow characteristic can be monitored using the flow meter. The flow characteristic can include the flow rate of the gas flow.

At block 508, information (or data) relating to the monitored flow characteristic can be transmitted to a remote device, via the communication device. The information can be transmitted in real-time, such as in the form of signal pulses for the monitored flow rate.

The method 500 can also include analyzing the monitored information (e.g., flow characteristic) for an alarm or other condition at block 510. For example, if the flow characteristic, such as the flow rate, satisfies (or not) a threshold or condition, then the processor determines that an alarm or other condition exists (or not). For example, an alarm condition exists if the flow rate is operating outside of normal operating parameters or values (e.g., too low or too high). At block 510, the report of the analysis of an alarm or other condition can also be transmitted to the remote device, via the communication device. It should be understood that the processor can also monitor and report other situations related to the flow meter, such as the state of the energy storage device and the state of the energy harvesting device (e.g., ON or OFF). Additional sensors can be incorporated into the flow meter to monitor these states (e.g., voltage sensor, current sensor, etc.).

The method shown and described for FIG. 5 is provided as an example. As would be understood by those skilled in the art, the various operations described in these methods can be modified while still retaining the same or similar functionality (e.g., some operations can be implemented in a different order or combined, or can be omitted).

Figure 6:
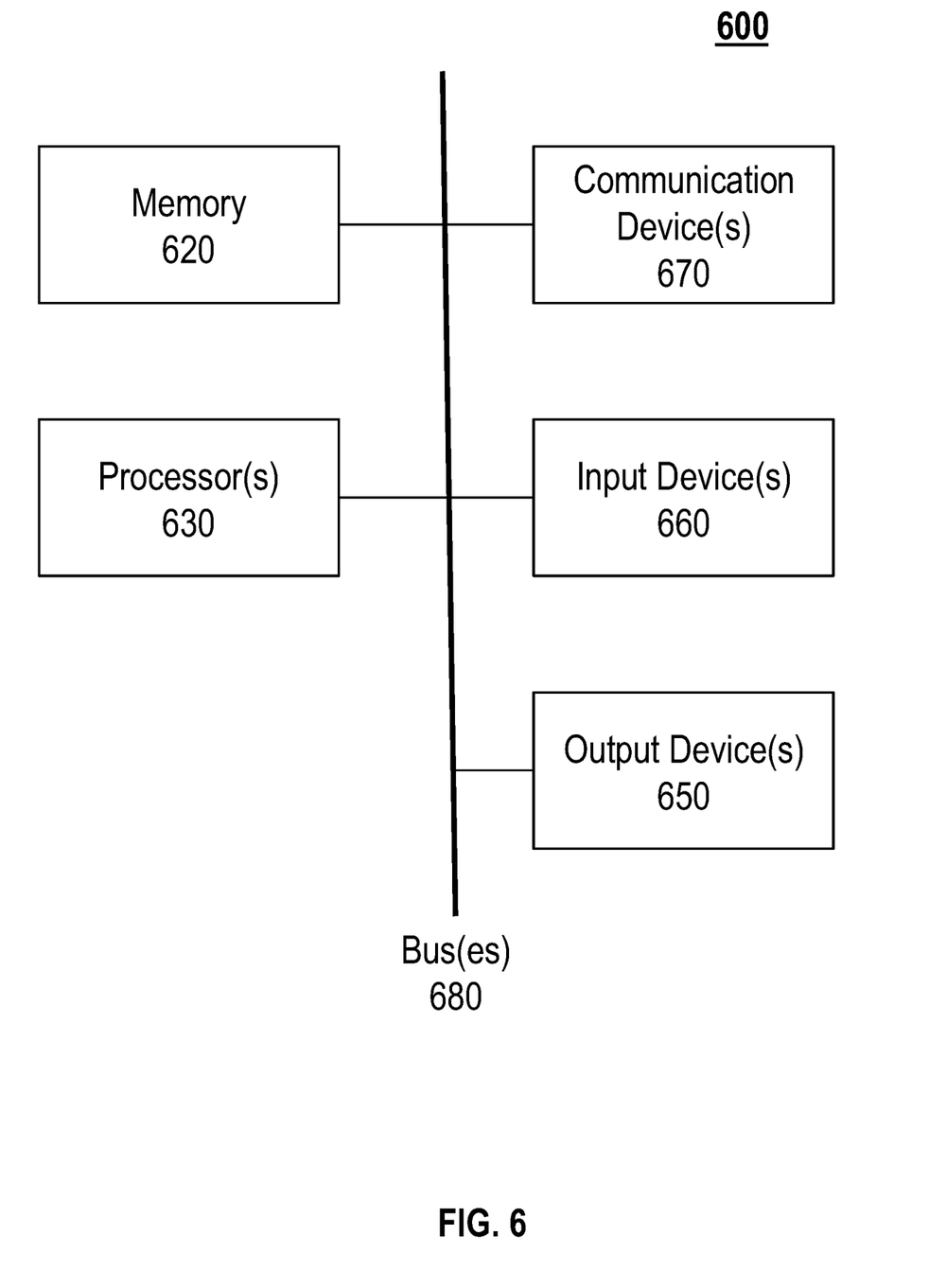
FIG. 6 illustrates example components of a computer system in accordance with an embodiment.

FIG. 6 illustrates example components of a computer system (or computing system) 600, in accordance with an embodiment. As shown in FIG. 6, the computer system 600 can include, for example, memory 620, processor(s) 630, output device(s) 650, input device(s) 660, communication device 670, and a bus system 680 between the components of the computer system. In various embodiments, the computer in the control facility can include such a computer system.

The memory 620 can store computer executable code, programs, software or instructions, which when executed by a processor(s), controls the operations of the computer system 600, including the various methods/processes described herein. The memory 620 can also store other data used by the computer system 600 or components thereof to perform the operations described herein. The other data can include but is not limited to sensed or processed sensor data, requesting or reporting data on the monitored flow rates or other characteristics of the monitored fluids, predetermined thresholds or conditions for implementing actions on the flow meter(s) or components, devices or systems of an industrial or other process, and other information described herein.

The output device(s) 650 can include a display device, printing device, speaker, and so forth. For example, the output device(s) 650 may output for display or present graphical user interface (GUI), reports of data received from one or more sensors in the monitoring, alarms, or other data or information, such as described herein.

The input device(s) 660 can include any user input device such as a mouse, trackball, microphone, touch screen, a joystick, control console, keyboard/pad, touch screen or other device operable by a user. The input device(s) 660 may also accept data from external sources, such other devices and systems.

The processor(s) 630, which interacts with the other components of the computer system, is configured to control or implement the various operations described herein. These operations can include: processing data received from one or more sensors, such as flow meter(s) (flow rate, data from which flow rate can be derived, status of power at the flow meter, etc.); calculating a flow rate or other monitored characteristics of the fluid(s) based on characteristics sensed by the one or more sensors or derived fluid characteristics of the fluid(s) to be monitored; storing and transmitting data; controlling power flow in the power system of the flow meter(s); taking action according to the monitored flow rate or other detected condition associated with a flow meter(s) including but not limited to alarms, notification, safety action (e.g., shutting down system or components in the industrial process) and so forth, or other processes described herein. The processor(s) can communicate with the flow meter(s) or other remote devices using the communication device 670, which can transmit or receive data across a transmitting medium or network.

The above describes example components of a computer system such as a computer, server or other data processing system. The output device and input devices 650 and 660 respectively may communicate with the processor 630 over a local bus or a network. The computer system may be a distributed processing system.

It should be understood that the examples of the energy harvesting techniques described herein can be implemented in various gas flow meters, including but not limited to turbine flow meters, differential pressure flow meters or other known gas flow meters. The differential pressure flow meters can include Orifice-plate flow meters, Venturi flow meters or other differential flow meters that use differential pressure principles to measure fluid flow.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) as described herein can be a processing system, which can include one or more processors, such as CPU, controller, ASIC, data processing circuitry, or other processing unit, which controls operations of the devices or systems or performs data or signal processing, described herein. Memory/storage devices can include, but are not limited to, disks, solid state drives, optical disks, removable memory devices such as smart cards, SIMS, semiconductor memories such as RAM, ROM, PROMS, etc. Transmitting mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A flow meter system for monitoring gas flow in a conduit, comprising a plurality of components including:
a sensor for sensing a flow rate of the gas flow;
a communication device for transmitting information corresponding to the sensed flow rate to a remote device;
an energy harvesting device for producing electrical energy from the gas flow to power operation of the communication device or other component of the flow meter system; and
an energy storage device for storing electrical energy generated by the energy harvesting device,
wherein the energy harvesting device comprises:
a differential pressure conduit having an orifice plate through which the gas flow passes, the sensor comprising a pressure differential sensor for sensing a pressure differential of the gas flow upstream and downstream of the orifice plate using pressure taps; and
a thermoelectric generator to convert heat generated from the gas flow passing through the differential pressure conduit to electrical energy for charging the energy storage device or powering one or more components of the flow meter system,
wherein the information, which corresponds to the flow rate, is transmitted in real time as a pulse signal via the communication device,
wherein the thermoelectric generator is arranged on a thermo-conductive portion of the differential pressure conduit, including the pressure taps and the orifice plate, to convert heat generated from the differential pressure conduit due to the gas flow around and through the orifice plate to electrical energy,
wherein each of the pressure taps extends through the thermoelectric generator from the differential pressure conduit.

2. The flow meter system according to claim 1, wherein the flow rate is sensed by the sensor using the energy harvesting device or a component thereof.

3. The flow meter system according to claim 1, wherein in response to the flow rate of the gas flow falling below a level at which the electrical energy generated by the energy harvesting device is sufficient to power one or more components of the flow meter system, the one or more components of the flow meter system are powered using the stored electrical energy of the energy storage device.

4. The flow meter system according to claim 1, wherein the differential pressure conduit or a portion thereof is made of a thermo-conductive material.

5. The flow meter system according to claim 4, wherein the thermoelectric generator is a solid state device capable of converting heat flux directly into the electrical energy.

6. The flow meter system according to claim 5, wherein the electrical energy generated from the thermoelectric generator is stabilized using a DC/DC converter.

7. A method of monitoring gas flow in a conduit using a flow meter system including a plurality of components, the method comprising:
sensing a flow rate of the gas flow using a sensor of the flow meter system;
transmitting information corresponding to the sensed flow rate to a remote device using a communication device of the flow meter system;
producing electrical energy from the gas flow, using an energy harvesting device, to power operation of the communication device or other component of the flow meter system; and
storing in an energy storage device electrical energy generated by the energy harvesting device,
wherein the energy harvesting device comprises:
a differential pressure conduit having an orifice plate through which the gas flow passes, the sensor comprising a pressure differential sensor for sensing a pressure differential of the gas flow upstream and downstream of the orifice plate using pressure taps; and
a thermoelectric generator to convert heat generated from the gas flow passing through the differential pressure conduit to electrical energy for charging the energy storage device or powering one or more components of the flow meter system,
wherein the information, which corresponds to the flow rate, is transmitted in real time as a pulse signal via the communication device,
wherein the thermoelectric generator is arranged on a thermo-conductive portion of the differential pressure conduit, including the pressure taps and the orifice plate, to convert heat generated from the differential pressure conduit due to the gas flow around and through the orifice plate to electrical energy,
wherein each of the pressure taps extends through the thermoelectric generator from the differential pressure conduit.

8. The method according to claim 7, wherein the flow rate is sensed by the sensor using the energy harvesting device or a component thereof.

9. The method according to claim 7, wherein in response to the flow rate of the gas flow falling below a level at which the electrical energy generated by the energy harvesting device is sufficient to power one or more components of the flow meter system, the one or more components of the flow meter system are powered using the stored electrical energy of the energy storage device.

10. The method according to claim 7, wherein the thermoelectric generator is a solid state device capable of converting heat flux directly into the electrical energy.

11. The method according to claim 10, wherein the electrical energy generated from the thermoelectric generator is stabilized using a DC/DC converter.

12. A tangible computer medium storing computer executable code, which when executed by one or more processors, is configured to implement a method of monitoring gas flow in a conduit using a flow meter system including a plurality of components, the method comprising:
controlling receipt of data relating to a flow rate of the gas flow sensed by a sensor of the flow meter system;
controlling transmission of information corresponding to the sensed flow rate to a remote device using a communication device of the flow meter system;
controlling production of electrical energy from the gas flow, by using an energy harvesting device, to power operation of the communication device or other component of the flow meter system; and
controlling storage, in an energy storage device of the flow meter system, of electrical energy generated by the energy harvesting device, wherein the energy harvesting device comprises:
a differential pressure conduit having an orifice plate through which the gas flow passes, the sensor comprising a pressure differential sensor for sensing a pressure differential of the gas flow upstream and downstream of the orifice plate using pressure taps; and
a thermoelectric generator to convert heat generated from the gas flow passing through the differential pressure conduit to electrical energy for charging the energy storage device or powering one or more components of the flow meter system,
wherein the information, which corresponds to the flow rate, is transmitted in real time as a pulse signal via the communication device,
wherein the thermoelectric generator is arranged on a thermo-conductive portion of the differential pressure conduit, including the pressure taps and the orifice plate, to convert heat generated from the differential pressure conduit due to the gas flow around and through the orifice plate to electrical energy,
wherein each of the pressure taps extends through the thermoelectric generator from the differential pressure conduit.

13. The tangible computer medium according to claim 12, wherein the thermoelectric generator is a solid state device capable of converting heat flux directly into the electrical energy.

14. The tangible computer medium according to claim 13, wherein the electrical energy generated from the thermoelectric generator is stabilized using a DC/DC converter.

15. A flow meter system for monitoring gas flow in a conduit with an orifice plate, comprising a plurality of components including:
a pressure differential sensor for sensing a pressure differential of the gas flow upstream and downstream of the orifice plate using pressure taps;
a communication device for transmitting information corresponding to the sensed flow rate to a remote device;
an energy harvesting device for producing electrical energy from the gas flow to power operation of the communication device or other component of the flow meter system, the energy harvesting device comprising a turbine for generating electrical energy from the gas flow, the turbine being configured to receive a portion of the gas flow from the conduit through at least one of the pressure taps;
a valve switch for selectively directing the portion of the gas flow to the pressure differential sensor or the turbine; and
an energy storage device for storing electrical energy generated by the energy harvesting device.

16. The flow meter system according to claim 15, wherein the valve switch is configured to direct the portion of the gas flow to the turbine when monitoring of the gas flow is not being performed using the pressure differential sensor.

17. The flow meter system according to claim 15, wherein the valve switch is configured to operate between directing the portion of the gas flow to the pressure differential sensor and directing the portion of the gas flow to the turbine according to a time pattern between monitoring duration and energy generating duration.

18. A method of operating components of a flow meter system to monitor gas flow in a conduit with an orifice, comprising
sensing via a pressure differential sensor a pressure differential of the gas flow upstream and downstream of the orifice plate using pressure taps;
transmitting via a communication device information corresponding to the sensed flow rate to a remote device;
producing via an energy harvesting electrical energy from the gas flow to power operation of the communication device or other component of the flow meter system, the energy harvesting device comprising a turbine for generating electrical energy from the gas flow, the turbine being configured to receive a portion of the gas flow from the conduit through at least one of the pressure taps;
selectively directing via a valve switch the portion of the gas flow to the pressure differential sensor or the turbine; and
storing via an energy storage device electrical energy generated by the energy harvesting device.

19. The method according to claim 18, wherein the valve switch is configured to direct the portion of the gas flow to the turbine when monitoring of the gas flow is not being performed using the pressure differential sensor.

20. The method according to claim 18, wherein the valve switch is configured to operate between directing the portion of the gas flow to the pressure differential sensor and directing the portion of the gas flow to the turbine according to a time pattern between monitoring duration and energy generating duration.

* * * * *